ABSTRACT

United States Patent [19]
Asano

[11] 3,979,761
[45] Sept. 7, 1976

[54] AUTO-PROCESS CAMERA
[75] Inventor: Yoshio Asano, Hyogo, Japan
[73] Assignee: Fuji Photo Film Co., Ltd., Minami-ashigara, Japan
[22] Filed: Apr. 5, 1974
[21] Appl. No.: 458,361

[30] Foreign Application Priority Data
Apr. 5, 1973 Japan................................ 48-39015

[52] U.S. Cl. ................................ 354/86; 354/181
[51] Int. Cl.² .................................... G03B 17/50
[58] Field of Search ............... 354/83, 84, 86, 174, 354/180, 181, 186, 275, 276, 277

[56] References Cited
UNITED STATES PATENTS
| | | | |
|---|---|---|---|
| 2,496,630 | 2/1950 | Land .................................... | 354/86 |
| 3,359,877 | 12/1967 | Kitrosser ............................ | 354/277 |
| 3,550,515 | 12/1970 | Erlichmann ....................... | 354/86 X |
| 3,595,661 | 7/1971 | Gold ................................. | 354/174 X |

*Primary Examiner*—Fred L. Braun
*Attorney, Agent, or Firm*—Sughrue, Rothwell, Mion, Zinn and Macpeak

[57]  ABSTRACT

An auto-process camera which permits unloading, and subsequent reloading, of a cassette containing film monosheets, without the monosheets being exposed. When a cassette is initially loaded in the camera, a light-proof protective board, which protects the monosheets therein prior to use thereof, is removed via an extraction passage leading to the camera exterior, the extraction passage being also employed for removal of exposed monosheet. If it is required to unload the cassette while there are still unexposed monosheets therein, the protective board is re-inserted into the camera, either through the extraction passage, or through another passage provided specifically for re-insertion of the board, push elements are actuated to move the contents of the cassette slightly rearwards, to permit unhindered entry of the board into the cassette, and the board is then moved into its original position in the cassette, after which the cassette may be unloaded, the monosheets therein remaining unexposed, and available for subsequent use. Actuation of the push elements and re-insertion of the protective board may be effected manually, or by automatically actuated electronic control device.

9 Claims, 27 Drawing Figures

AUTO-PROCESS CAMERA

BACKGROUND OF THE INVENTION

The present invention relates to photographic equipment, and more particularly to a camera permitting development of films by diffusion-transfer process within the camera.

It is known to provide a type of camera in which a film be processed as well being exposed, whereby it is possible to obtain a positive print of an object to be photographed, almost immediately after a film in the camera has been exposed to image rays from the object. Film employed in such a camera is a special type, each unit of which comprises a combination of a negative film portion and a positive film portion associated with a sac containing a solution of photographic processing chemicals. This type of camera goes under a variety of popular or trade names, such as auto-copy, or auto-process camera. Similarly, film associated with this type of camera goes under a variety of appellations, for example, instant-print film, film-sheet, or monosheet. For the purposes of the present description, this type of camera, and the type of film associated therewith, will be referred to, respectively, as auto-process camera and monosheet.

Monosheets are normally provided in a cassette, or pack, which holds a definite number of monosheets, and which is loadable into an auto-process camera. Each cassette comprises a suitable light-proof cover, which protects the set of monosheets in the cassette from exposure to light, prior to use of the monosheets, and which, when the cassette has been loaded into an auto-process camera, is removable by a suitable means provided in the camera. For each photograph taken, the negative film portion of a monosheet is exposed, and te monosheet is then withdrawn from the cassette, or pack, by means provided in the auto-process camera, passed through processing rolls, or similar means, which extrude the processing solution from the sac portion of the monosheet, thereby effecting diffusion and transfer of the image of the object photographed onto the positive film portion of the monosheet, after which the monosheet is moved through a suitable opening to the exterior of the camera. A photographer is thus saved the trouble of having to go to a separate establishment in order to obtained a completed copy, and also, since processing is extremely rapid, may know almost immediately whether or not a photograph has been taken in a required manner, and so whether or not it is necessary to take another shot. Various advances have been made relative to monosheets, for example by the provision of monosheets having improved qualities, or different speeds, or sensitivities to light. There has also been progress relating to auto-process cameras, but one outstanding drawback of conventional auto-process cameras is that the cameras do not permit unloading and subsequent reloading of one and the same cassette containing monosheets. That is, once a particular cassette has been loaded into a conventional auto-process camera, and the light-proof cover thereof has been removed, if the cassette is unloaded while there are still unexposed monosheets remaining therein, the foremost remnant monosheet is completely exposed, through an unprotected main front opening of the cassette, and other remnant monosheets are at least partially exposed by light entering the cassette via monosheet extraction slits or similar portions. Because of this, if, after initially loading a conventional auto-process camera with a cassette containing monosheets having a certain sensitivity, and after taking a certain number of shots, a photographer wishes to photograph a scene or object requiring monosheets having a different sensitivity, or other characteristics, he or she must either waste the remaining monosheets, by loading a new cassette, or renounce taking the required shots. A photographer is faced with a similar problem when there are only 2 – 3 unexposed monosheets left in a cassette loaded in a camera, and he or she anticipates taking 6 – 8 shots in rapid succession, for example, of an action scene, such as a race. In this case also, the photographer must either reload a new, full cassette, and so waste the remaining 2 – 3 monosheets, or renounce taking the required number of shots.

SUMMARY OF THE INVENTION

It is accordingly a principal object of the present invention to provide an auto-process camera which makes it possible for a cassette to be unloaded from the camera, without risk of undesired exposure of any monosheets remaining in the cassette, and for the cassette to be subsequently reloaded into the camera and the remaining monosheets therein exposed to produce photographs.

In accomplishing this and other objects, there is provided, according to the present invention, an auto-process camera comprising a mounting portion for accommodation of a cassette containing monosheets; removal means, which are actuated in association with shutter release action to remove a lightproof, re-insertable protective board, or an exposed, foremost monosheet from the cassette; a generally vertical extraction passage, which is formed in the upper portion of the camera, and through which a protective board, or exposed monosheet may be removed to the exterior of the camera, latent images formed on monosheets thus removed being developed due to the action of processing rolls provided in the extraction passage; a sloping re-insertion passage, which also is formed in the upper portion of the camera, and via which the protective board of a loaded cassette may be guided back into a foremost position in the cassette, to close the cassette to light and prevent exposure of any monosheets remaining therein; and push means, which are actuated, by a manually controlled knob provided externally on the camera, to contact non-sensitive portions of a foremost monosheet, or the front of an inner frame holding monosheets in a loaded cassette, and to push the foremost monosheet, or inner frame and monosheets therein, slightly rearwards, thereby permitting easy re-insertion of the protective board. Once the protective board of a cassette has been re-inserted in this manner, the cassette may be unloaded, while monosheets remaining therein are protected from exposure to light. When it is subsequently required to use these remaining monosheets, the cassette is reloaded, the protective board is removed, in the same manner as upon initial loading, and the monosheets are then exposed as required. The auto-process camera of the invention has various embodiments, according to which re-insertion of a protective board is completely manual, or is assisted by the monosheet removal means being actuated in reverse, upon closure of a switch, either by the protective board itself entering the re-insertion passage, or by a means connecting the above-mentioned push means. The push means also may be actuated automatically upon closure of a switch or similar means by a protective board entering the re-insertion passage. Further, the re-insertion passage may be dispensed with, and a protective board re-inserted into a cassette via the monosheet extraction passage

BRIEF DESCRIPTION OF THE DRAWINGS

A better understanding of the present invention may be had from the following full description of various embodiments thereof, when read in reference to the attached drawings.

In the drawings, wherein like numerals refer to like parts,

FIG. 8 a – f are sequential drawings showing monosheet removal, and light-proof board removal and re-insertion from and into a loaded cassette;

DESCRIPTION OF THE INVENTION

Reference is had initially to FIGS. 1 through 10, which show a first embodiment of the invention.

Figures 1, 5, 6, 9:
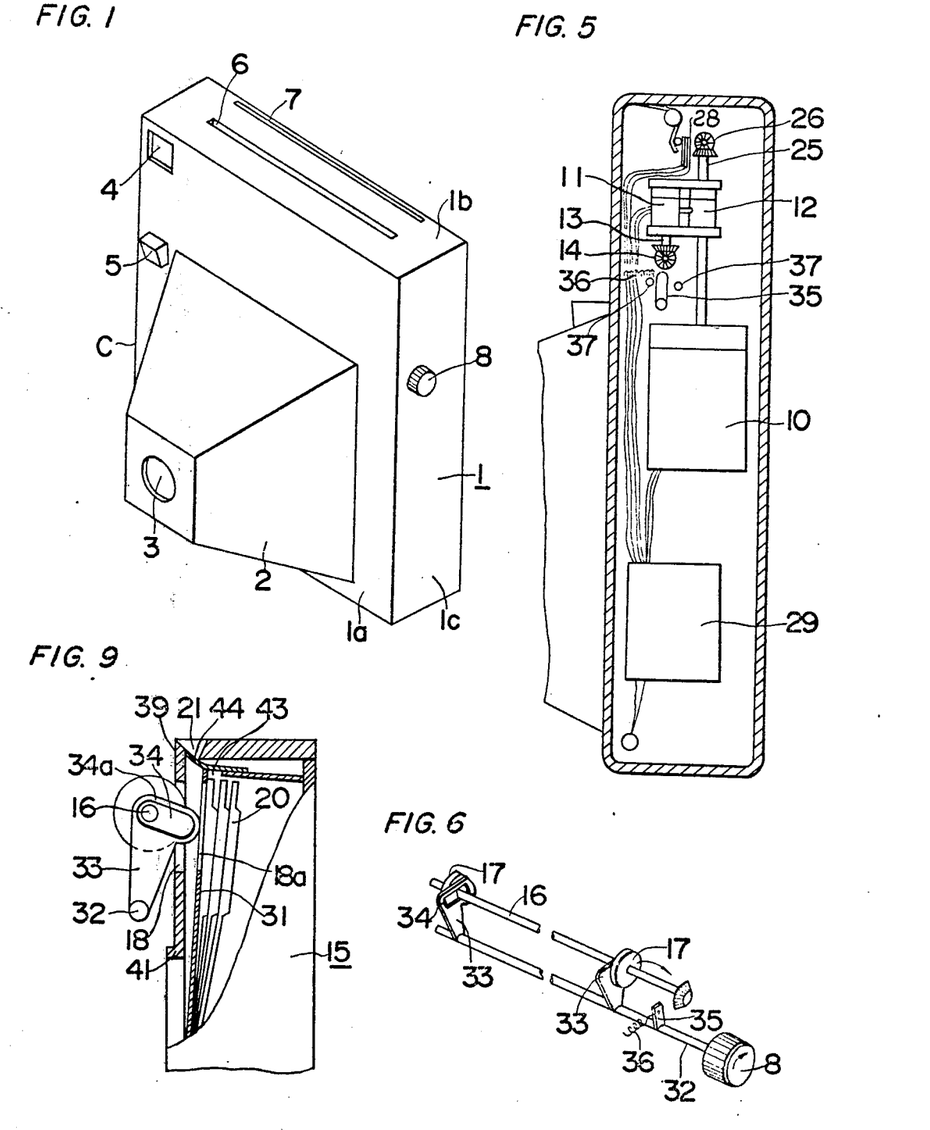
FIG. 1 is a perspective view showing general external features of the invention.
FIG. 5 is a side view showing lay-out of drive means.
FIG. 6 is a detail view of friction rollers and associated push elements.
FIG. 9 is a detail view showing push element action.

In FIG. 1 there is shown an auto-process camera C comprising a main portion 1, on the front wall 1a of which there is mounted a conventional lens mount portion 2 carrying a lens 3. The main portion 1 comprises a conventional viewfinder 4 and shutter release button 5. In the main portion top wall 1b there is formed a monosheete and protective board exit slit 6, which extends in a left-to-right alignment, and a protective board re-insertion slit 7, which is parallel to the slit 6, and nearer to the rear edge of the top wall 1b. On the outside of a side wall 1c of the camera main portion 1 there is provided a knob 8, whose function is described in further detail below. The rear wall of the camera main portion 1 constitutes a cover 9, which may be opened to permit loading of a cassette 15 containing monosheets 20 into the camera interior, and then closed by a suitable catch means.

Figures 2, 7, 11, 12, 13:
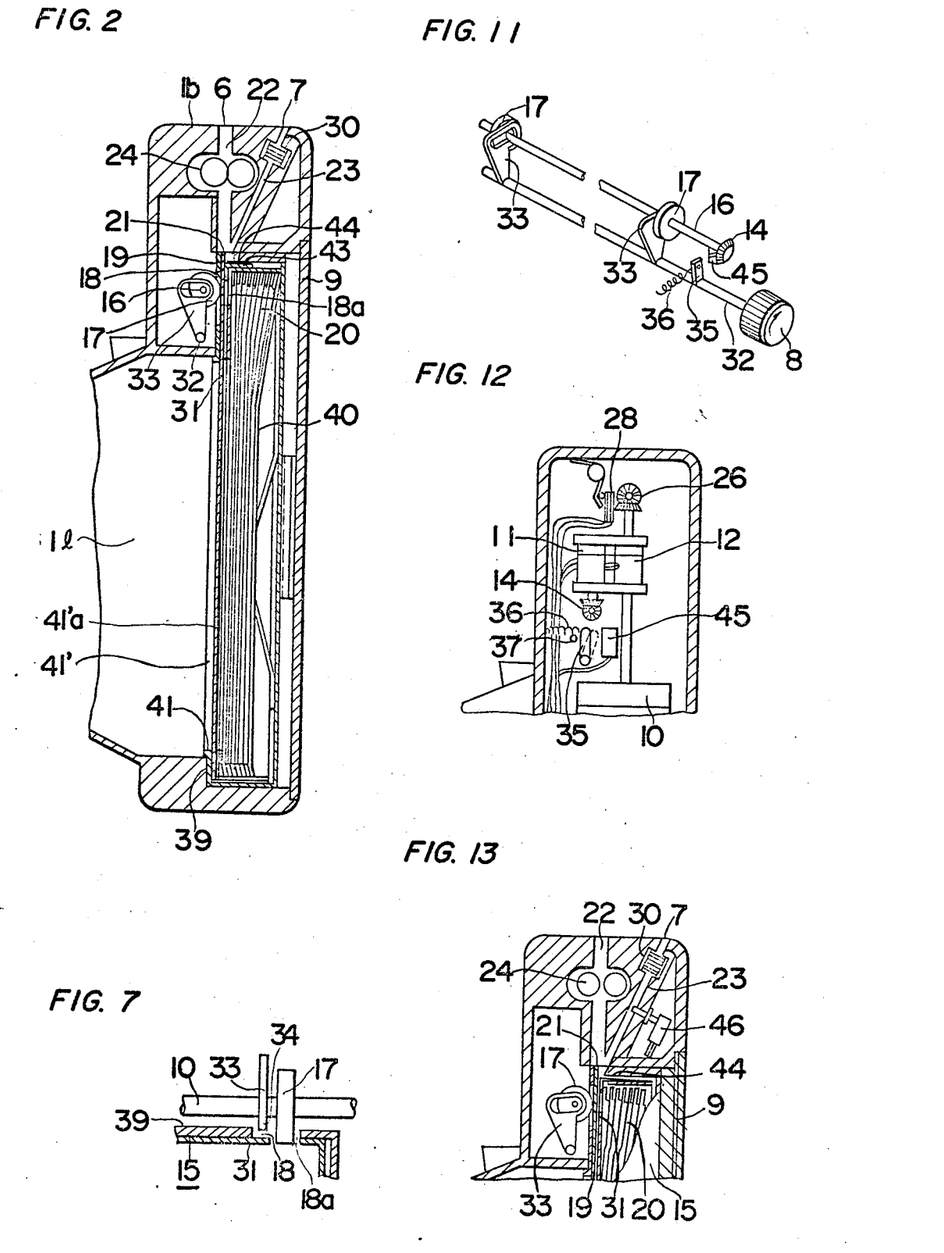
FIG. 2 is a cross-sectional view showing a monosheet cassete loaded therein.
FIG. 7 is a detail view showing positions of a friction roller and a push element relative to cassette front openings.
FIG. 11 is a detail view of friction roller and push element means therein of a second embodiment of the invention.
FIG. 12 is a detail view showing location of a switch therein.
FIG. 13 is a cross sectional view thereof of a third embodiment of the invention.

Referring to FIG. 2, the exit slit 6 communicates with a vertical passage 22, which leads downwards through the upper part of the main portion 1, to the main portion interior 1e, and which comprises an enlarged portion accommodating a pair of processing rolls 24. The processing rolls 24 are level and parallel with one another and extend in a left to right alignment, and normally contact one another and prevent light from passing through the passage 22 into the main portion interior 1e. The re-insertion slit 7 constitutes the upper, outer end of a downwardly and forwardly inclined passage 23, which communicates with the main portion interior 1e at the same point as the removal passage 22, and in which there is provided a pair of light-excluding elements 30. The light-excluding elements 30 may be constituted by, for example, a pair of felt pads, or similar elements possessing pile surfaces, which prevent light from passing through the passage 23 into the camera main portion interior 1e, but which permit a relatively rigid element such as a board to be passed therebetween. At an upper, front location of the main portion 1, and extending slightly into an upper, front part of the main portion interior 1e, there is provided a friction roller 17, with which is associated a push element 33 described below. Near the other side of the camera main portion, not shown in FIG. 2, there is provided another friction roller 17 and associated push element 33.

Figure 3:
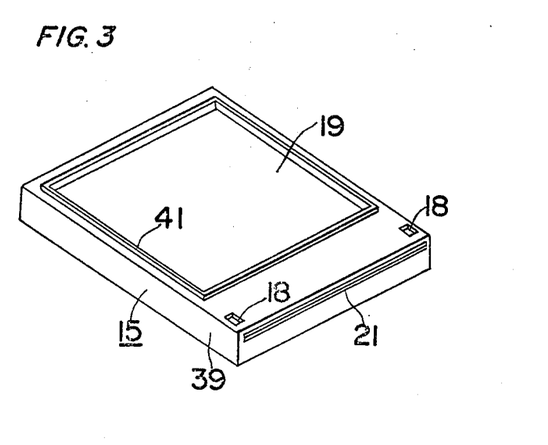
FIG. 3 is a perspective view of a monosheet cassette associable therewith.

Still referring to FIG. 2, and also referring to FIG. 3, the camera main portion interior 1e accommodates a cassette 15. The cassette 15, which, of course, is only one example of a cassette associable with the camera of the invention, comprises an outer case 39, and an inner frame 31, which fits inside the outer case 39, and within which lie monosheets 20. On the inner side of the rear wall of the outer case 39 there is mounted a plate spring 40, which contacts the rearmost monosheet 20 in the cassette 15, and exerts a constant force urging the monosheets 20, and, acting through the monosheets 20, the inner frame 31, towards the front wall of the outer case 39. The front walls of the outer case 39 and of the inner frame 31 form large, generally rectangular openings, 41' and 41a', respectively, which are equal in dimensions to the negative film portion of a monosheet 20, and through which a foremost monosheet 20 in the cassette 15 may be exposed. The front opening 41' of the outer case 39 is bordered by a rim 41, which projects forwards slightly, and, when the cassette 15 is loaded in the camera C, fits into a complementary shaped portion of the camera interior 1e, whereby the cassette exposure openings 41', 41a' are positioned in alignment with the camera lens 3, and a foremost monosheet 20 in the cassette 15 may be correctly exposed. The front wall of the outer case 39 further comprises two small, generally rectangular openings 18, which are well-shaped, and are formed near opposite corners of the leading end portion of the outer case front wall, the cassette leading end being that end thereof from which exposed monosheets are withdrawn, and which is uppermost when the cassette 15 is loaded in the camera C. In the front wall of the inner frame 31 also there are formed small, generally rectangular openings 18a, which lie in line with, but are somewhat smaller than the openings 18 in the outer case front wall. During non-use of the cassette 15, monosheets 20 therein are protected from exposure to light passing through the large exposure openings 41', 41a', or small rectangular openings 18, 18a by a light-proof protective board 19, which is approximately equal in size to the front wall of the inner frame 31, and is positioned between the front wall of the inner frame 31 and the front wall of the outer case 39, and in line with an extraction slit 21 in the outer case 39. The protective board 19 is made of any suitable material, such as cardboard, and is slightly flexible, in order to facilitate re-insertion thereof into the cassette 15, as described below.

Still in FIGS. 2, 3, the extraction slit 21 is formed by the forward edge of the leading end wall of the outer case 39, and permits exposed monosheets 20, or the protective board 19 to be withdrawn from the cassette 15. When the cassette 15 is loaded in the camera C, the extraction slit 21 lies in line with the extraction passage 22 (FIG. 2). In the leading end wall of the cassette inner frame 31 there is formed an extraction slit 43. The foremost of the monosheets lying within the frame 31 is always brought into line with the slit 43, due to the action of the plate spring 40. The extraction slit 43 is normally sealed to light by a light-proof flexible strip 44, the rear edge of which is bonded to the leading end wall of the inner wall 31, and which is wide enough to extend beyond the slit and front wall of the inner frame 31. When the protective board 19 is in the cassette 15, the light-proof strip 44 wraps around the front, leading end corner of the frame 31, thus covering the slit 43, and the front portion of the strip 44 is held between the board 19 and the front wall of the inner frame 31.

Figure 4:
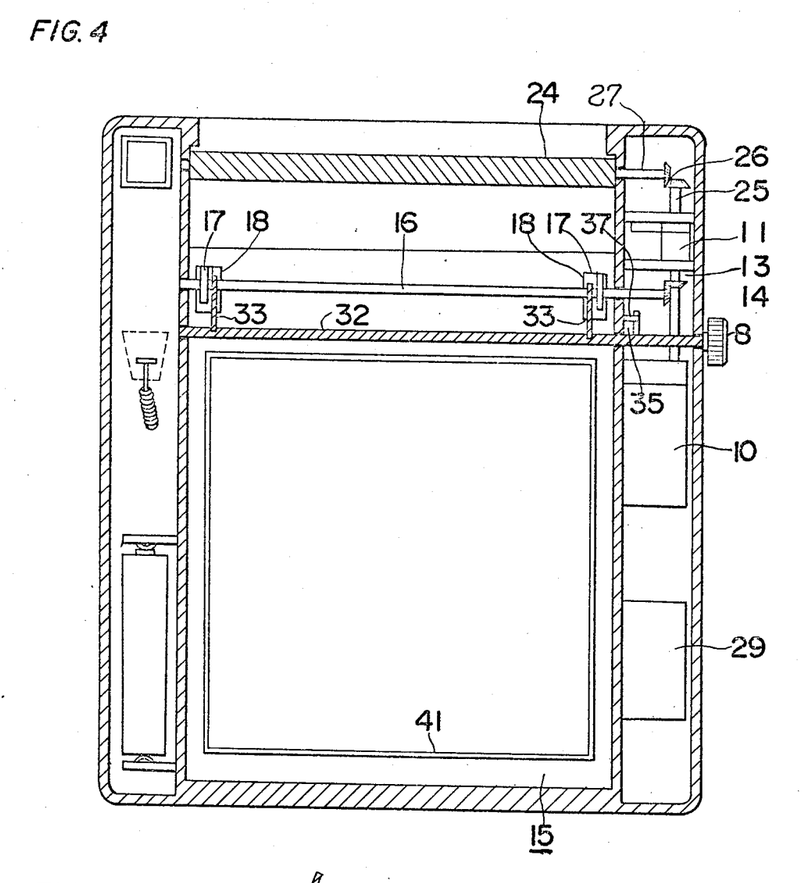
FIG. 4 is a front view thereof taken in section.

Referring now to FIGS. 4 and 5, the friction rollers 17, and associated push elements 33, may be seen to be in line with the small front openings 18 of the cassette 15 loaded in the camera C. The friction rollers 17 are fixedly mounted on, and rotatable together with, a shaft 16, which extends in a left to right alignment, and is rotatably mounted in an upper part of the camera main portion 1. In a side part of the main portion 1 there is provided a motor 10, from which drive may be supplied, through an electromagnetic clutch 11, to a horizontally aligned bevel gear 13. The bevel gear 13 engages and drives a vertically aligned bevel gear 14, which is fixedly mounted on one end of the friction roller shaft 16, whereby the motor 10 may drive the friction rollers 17. Drive from the motor 10 is also supplied through an electromagnetic clutch 12 to another horizontally aligned bevel gear 25, which engages and drives a vertically aligned bevel gear 26. The bevel gear 26 is fixedly mounted on one end of a horizontal shaft 27, which is in fixed coaxial connection with, or forms an integral extension of, one of the abovementioned processing rolls 24, whereby the motor 10 may drive the rolls 24. Actuation of the motor 10, clutches 11, 12, and of other electrical elements, described later, in the camera C, is effected through a control box 29 provided below the motor 10.

Adjacent to, and forward of, the front processing roll 24, there is provided a switch 28 (FIG. 5), which, when actuated, supplies a signal to the control box 29 to immediately disengage the clutch 11, and to disengage the clutch 12 and stop the motor 10 after a certain delay. The switch 28 is normally unactuated, but is contacted and actuated by the front processing roll 24, when a monosheet 20, or the protective board 19, is passed between the rolls 24 in a manner described below, and the front roll 24 is moved forwards slightly, away from the rear roll 24. As shown most clearly in FIG. 4, the abovementioned push elements 33 are fixedly mounted on a rotatably mounted shaft 32, which extends in a left to right alignment below the friction roller shaft 16, and one end of which extends to the outside of the main portion side wall 1c. The abovementioned knob 8 is fixedly mounted on this outer end of the shaft 32, whereby manual rotation of the knob 8 may cause rotation of the shaft 32 and push elements 33.

Referring now to FIG. 6, each push element 33 comprises a base portion fixedly attached to and extending upwards from the shaft 32, and an upper portion, which is at approximately right-angles to the base portion, and constitutes a contact portion 34, and in which there is formed an elliptical slot 34a. The friction roller shaft 16 passes through the slot 34a of each push element 33. The slots 34a are large enough to permit the push elements 33 to be rotated and the contact portions 34 thereof to be moved forwards or rearwards, i.e., outwards or inwards with respect to the camera interior 1e, without hindrance to rotation of the friction roller shaft 16. A small projection 35 is fixedly attached to the shaft 32, near the knob 8 end thereof. One end of a compression spring 36 is fixedly attached to the projection 35, and the other end thereof is fixedly attached to a front wall of the camera interior 1e, whereby the spring 36 acts to cause the shaft 32 to rotate into an alignment in which the contact portions 34 of the push elements 33 are moved outwards with respect to the main portion interior 1e. The contact portions 34 may, however, be moved inwards with respect to the main portion interior 1e, counter to the force of the spring 36, by manual rotation of the knob 8 (clockwise in the drawing). As indicated in FIGS. 4, 5, to the front and rear of the projection 35, and at right-angles thereto, there are provided stop pins 37, which are fixedly attached to a wall of the camera main portion interior 1e, The projection 35 is brought into contact with one or the other of the stop pins 37, when the shaft 32 is rotated clockwise or anticlockwise a certain amount, whereby there are limits imposed to the amount of forward or rear movement of the contact portions 34 of the push elements 33.

As illustrated most clearly in FIG. 7, each friction roller 17 may pass completely both through a small opening 18 of the outer case 39 of the loaded cassette 15, and through the corresponding, slightly smaller opening 18a of the inner frame 31 thereof, whereas the associated push element 33 is so positioned that it may pass through the outer case opening 18 only. When the protective board 19 is not in the cassette 15 the rollers 17 extend through the cassette front openings 18, 18a and contact the foremost monosheet 20 in the cassette 15. In this situation, the push elements 33 are normally held out of contact with the cassette 15, due to the force of the spring 36 as noted above, but if the knob 8 is rotated to move the contact portions 34 of the push elements 33 rearwards, the contact portions 34 move through the cassette outer case front openings 18, and then come into contact with the front wall of the inner frame 31, whereby the leading (upper) end of the inner frame 31, is pushed slightly rearwards, away from the front wall of the outer case 39. If the protective board 19 is still in the loaded cassette 15, the friction rollers 17 extend through the outer case openings 18 only, and contact the board 19.

Figure 8:
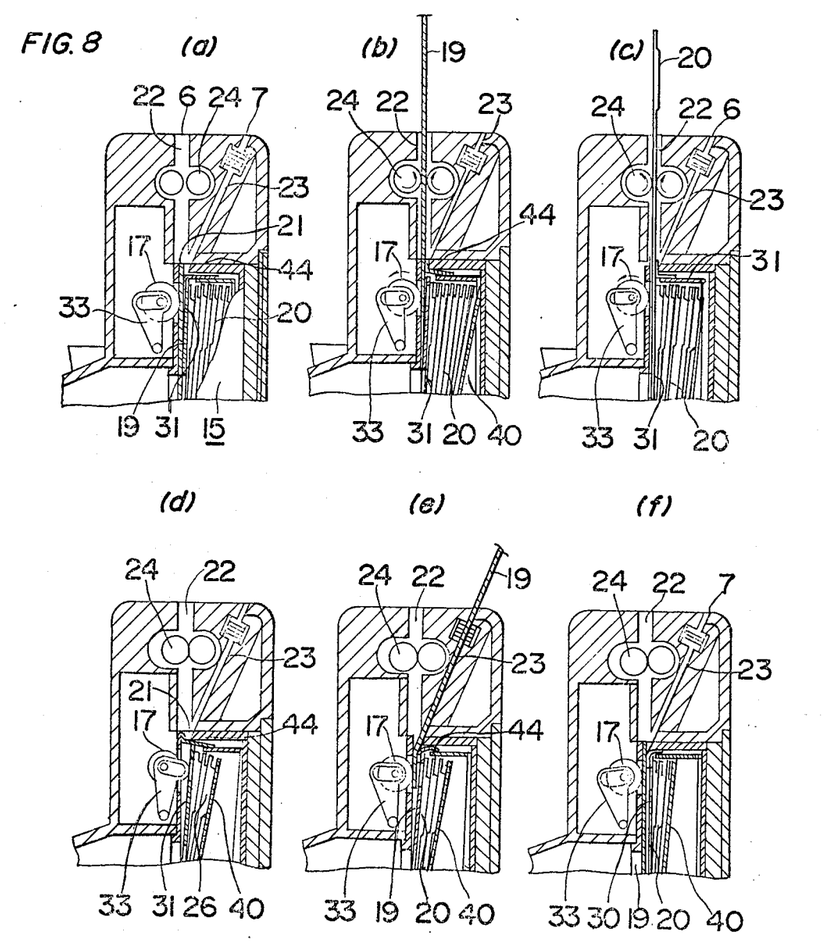
Figure 10:
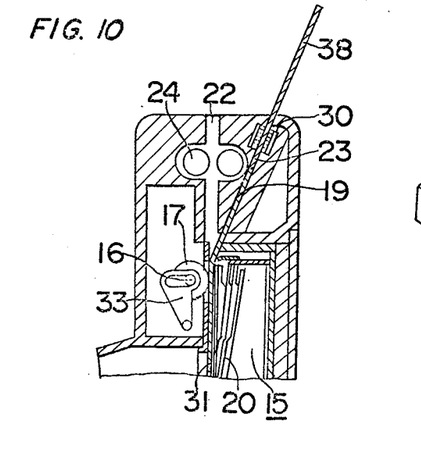
FIG. 10 is an enlarged view showing re-insertion of a light-proof board.

Reference is now had to FIGS. 8, through 10, which illustrate operation of the above-described auto-process camera.

When the cassette 15, still containing the protective board 19 is loaded in the camera C, friction rollers 17 extend through the cassette outer case openings 18 and contact the front of the board 19, and the push elements 33 are held out of contact with the cassette 15 (FIG. 8a). The shutter release button 5 is now actuated, to take a blank shot, whereupon a signal is supplied, through a suitable means not shown, to the control box 29, which simultaneously actuates the motor 10, and causes the clutches 11 and 12 to be engaged. The friction rollers 17 and processing rolls 24 are therefore rotated in the directions shown in FIG. 8b, and the protective board 19 is moved by the friction rollers 17 out of the cassette 15, via the slit 21, and moved upwards through the extraction passage 22, to between the processing rolls 24. When the board 19 comes between the processing rolls 24, the front wall 24 closes the above-mentioned switch 28 (FIG. 5), which supplies a signal to the control box 29, whereupon the clutch 11 is immediately disengaged, but the clutch 12 remains in engagement and the motor 10 still continues to run. Clutch 11 being disengaged, drive to the friction rollers 17 is cut, and the board 19 continues to be moved upwards through the extraction passage 22 by the processing rolls 24 alone, and is moved to the exterior of the camera C via the exit slit 6 (FIG. 8b), after which it may be removed manually. When the board 19 has been moved to this exterior position, the clutch 12 is disengaged and the motor 10 is stopped, and so the rolls 24 stop rotating. This action may be effected by, for example, a delay circuit which is provided in the control box 29, and which is actuated upon receipt of a signal from the switch 28.

When the protective board 19 starts to be moved out of the cassette 15, the front portion of the light-proof flexible strip 44 covering the extraction slit 43 of the inner frame 31 is pushed outwards with respect to the cassette 15. When the protective board 19 has been withdrawn completely from the cassette 15, the outer case 39 remains in the same position, but the inner frame 31 and monosheets 20 are all moved forwards, by the plate spring 40, a distance equal to the thickness of the board 19, the front wall of the inner frame 31 is brought into contact with the front wall of the outer case 39, and the extraction slit 43 of the inner frame 31, and hence the foremost monosheet 20, is brought into line with the extraction slit 21 of the outer case 29. The foremost monosheet 20 may now be exposed through the cassette large front openings 41', 41a'. At this time, the light-proof strip 44 is flexed against the front wall of the outer case 39, and is still curved outwards with respect to the cassette 15, and so presents negligible resistance to withdrawal of a monosheet 20 from the cassette 15.

When the shutter release button 5 is actuated, to expose foremost monosheet 20, the friction rollers 17 and processing rolls 24 are actuated in the same manner as described above, and the exposed monosheet 20 is withdrawn from the camera C, as shown in FIG. 8c. The processing rolls 20, as well as directing the exposed monosheet 20 out of the camera C, also causes a developing solution to be extruded onto the monosheet 20 surface and a positive image to be developed in a known manner. Since the signal from the switch 28 causes the drive to the friction rollers 17 to stop immediately the exposed monosheet 20 comes between the processing rolls 24, only one monosheet at a time is withdrawn from the cassette 15. After this exposed monosheet 20 has been completely removed from the cassette 15, the remaining monosheets 20 are moved forwards by the plate spring 40, and a next monosheet 20 is brought into a foremost position for exposure and subsequent removal. For each subsequent shot, successive monosheets 20 are removed and processed in the same manner.

After a certain number, but not all, of the monosheets 20 in the loaded cassette 15 have been exposed and removed, if it is wished to load another cassette having a full complement of monosheets, whose characteristics may be the same as or different from those of the monosheets 20 already in the camera C, first the knob 8 (FIGS. 1, 6) is rotated manually to cause the push elements 33 to pivot rearwards. This rotation of the knob 8 causes the contact portions 34 of the push elements 33 to move inwards with respect to the cassette 15, through the outer case openings 18 (see FIG. 7), and push the top end of the inner frame 31 rearwards, and out of line with the slit 21 of the outer case 39, as shown in FIG. 9.

Next, the protective board 19 is inserted downwards through the re-insertion passage 23. The lower end portion of the board 19 is guided by the passage 23 to the cassette slit 21, and is then advanced to a foremost position in the cassette 15, between the front walls of the outer case 39 and inner frame 31, the board 19 being bent slightly upon entering the cassette 15, as shown in FIG. 8e. As the board 19 enters the cassette 15, the leading edge thereof pushes the light-proof strip 44 inwards with respect to the cassette 15, whereby the forward portion of the strip 44 is again held between the board 19 and the front wall of the inner frame 31, and the strip 44 again covers the monosheet extraction slit 43 of the inner frame 31. When the board 19 has been advanced sufficiently for the lower end thereof to have entered the cassette 15 and reach the level of the push elements 33, the knob 8 may be released, whereupon the push elements are moved back to their original positions, due to the push element shaft 32 being rotated back by the spring 36 acting on the projection 35 (FIG. 6).

After the board 19 has been advanced a distance such that the upper edge thereof is level with the opening 7 of the passage 23, continued advance of the board 19 through the passage 23 and into the cassette 15 is effected by a suitable supplementary means, such as an extension plate 38, which is inserted into the slit 7 and is used to push the board 19 further downwards as illustrated in FIG. 10. When the board 19 has been pushed completely into the cassette 15, the extension plate 38 is withdrawn, the protective board 19 and light-proof strip now being in their original configurations, as shown in FIG. 8f. The cassette 15 may therefore now be unloaded from the camera C, without any risk of exposure of the remnant monosheets 20, which thus remain available for subsequent use, and a new cassette may be loaded.

Reference is now had to FIGS. 11, 12, which show relevant parts of an alternative embodiment of the invention, wherein final re-insertion of the board 19 into the cassette 15 is effected by reverse action of the rollers 17.

This alternative embodiment of the invention comprises a switch 45, which is provided to the rear of the projection 35 on the push element shaft 32, and is connected electrically to circuit elements in the control box 29. When the knob 8 is rotated to cause the push elements 33 to pivot rearwards and push the cassette inner frame 31 away from the front wall of the outer case 39, the projection 35 is simultaneously brought into contact with, and closes the switch 45. Upon closure of the switch 45, the clutch 11 is engaged and the motor 10 is driven in reverse, whereby the friction rollers 17 are driven in reverse (clockwise in FIG. 11). When, now, the protective board 19 is inserted through the re-insertion passage 23 and into the cassette 15, as far as the level of the rollers 17, the knob 8 is released, to allow the push elements 33 to be drawn forwards again due to the force of the spring 36, whereupon the switch 45 is again opened, while at the same time the spring 40 in the cassette 15 pushes the monosheets 20 and inner frame 31 forwards again, and the front wall of the inner frame 31 pushes the board 19 into contact with the rollers 17. After re-opening of the switch 45, the clutch 11 remains engaged and the motor 10 continues to run a sufficient length of time for the board 19 to be drawn completely into the cassette 15 by the friction rollers 17, after which the clutch 11 is disengaged and the motor 10 is stopped. Remnant monosheets 20 in the cassette 15 are now protected from exposure, and the cassette 15 may be unloaded as described before.

In another alternative embodiment of the invention, shown in FIGS. 13 through 16, the push element control knob 8 is dispensed with, and re-insertion of the protective board 19 into the cassette 15 is effected autmatically.

In FIG. 13, there is provided a switch 46 approximately half-way along, and projecting slightly into the re-insertion passage 23. The switch 46 may be closed by the protective board 19 moving through the re-insertion passage 23, and, acting through the control box 29, the switch 46 effects engagement of the clutch 11, reverse drive of the motor 10, and controls actuation of a solenoid 47 and plunger 48 assembly.

Figure 14:
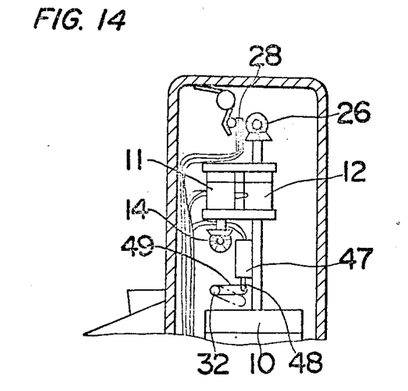
FIG. 14 is a detail view showing the location of a switch in the embodiment of FIG. 13.
Figures 15, 16:
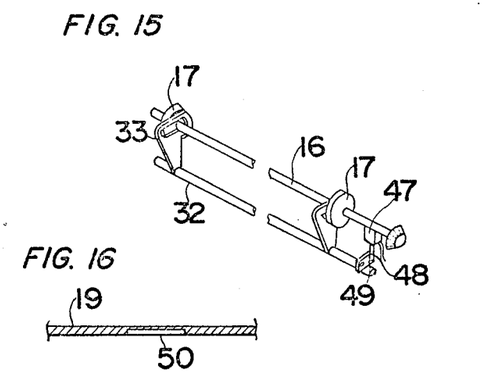
FIG. 15 is a detail view of friction roller and push element means therein.
FIG. 16 is a cross-sectional view of a cassette light-proof board associable therewith.

As shown in FIG. 14, and in greater detail in FIG. 15, the solenoid 47 is provided near the left-hand end of the push element shaft 32. The outer end of the plunger 48 connects to the rear end of an actuator piece 49, which is fixedly attached to and projects rearwardly from the push element shaft 32. When the solenoid 47 is not energized, the plunger 48 holds the actuator piece 49 in a generally horizontal alignment, and the push elements 33 are held out of contact with the cassette 15. When the solenoid 47 is energized, the plunger 48 pushes the actuator piece 49 downwards, to the position indicated by the chain-dot line portion of FIG. 14, whereby the shaft 32 is rotated, and the contact portions 34 of the push elements 33 are moved rearwards to push the top end of the cassette inner frame 31 away from the front wall of the outer case 39.

As shown in FIG. 16, the protective board 19 of a cassette 15 associable with this embodiment of the invention comprises a depression 50. The depression 50 is formed at a location on the board 19 such that during re-insertion of the board 19 into the cassette 15, the depression 50 comes opposite the switch 46 in the re-insertion passage, just at the time the lower end portion of the board 19 comes to the level of the friction rollers 17 and push elements 33. When the protective board 19 is moved through the re-insertion passage 23, the switch 46 is first closed, by the lower end portion of the board 19, then opens, when the depression 50 comes opposite thereto, and then closed again, by the upper end portion of the board 19.

When the switch 46 is first closed by the lower end portion of the board 19, the clutch 11 is engaged, the motor 10 supplies reverse drive, and the solenoid 47 is simultaneously energized, whereby the friction rollers 17 are rotated in reverse, and the push elements 33 are moved to push the cassette inner frame 31 rearwards slightly. When the depression 50 comes into line with the switch 46, and the switch 46 opens, i.e., when the lower end of the board 19 comes into line with the friction rollers 17, the clutch 11 remains in engagement, and the motor 10 continues to supply reverse drive to the rollers 17, but the solenoid 47 is de-energized. The push elements 33 are therefore moved back to their original positions, out of contact with the cassette 15, and the rollers 17 draw the board 19 downwards into the cassette 15. As the board 19 continues to be moved downwards, the upper end thereof comes into contact with, and closes the switch 46. Upon this second closure of the switch 46, the solenoid 47 is not again energized, and after a delay long enough for the board 19 to have been drawn completely into the cassette 15, the clutch 11 is disengaged and the motor 10 is stopped. By this time, of course, the switch 46 is again open, since it is no longer contacted by the board 19, the various elements of the camera C are in their original conditions, and the cassette 15 may be unloaded.

Figure 17:
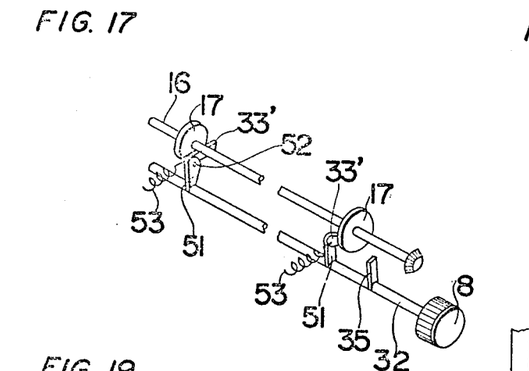
FIG. 17 is a detail view of friction roller and push element means therein of a fourth embodiment of the invention.
Figure 18:
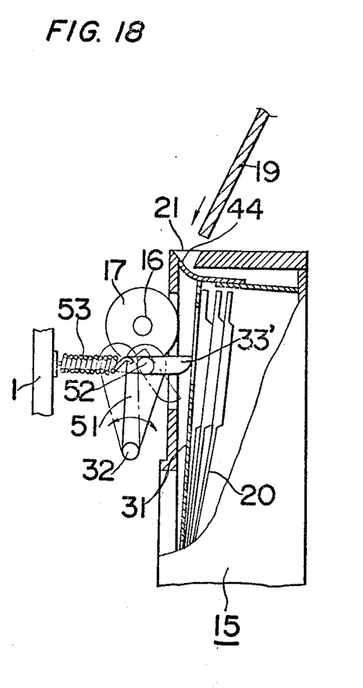
FIG. 18 shows a detail view of the reinsertion of the protective board.
Figure 19:
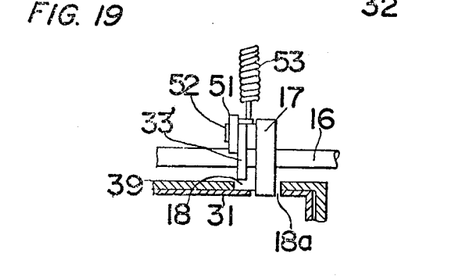
FIG. 19 is detail view showing location of the means of FIG. 17 relative to a cassette.

Referring now to FIGS. 17 through 19 there is shown another alternative embodiment of the invention wherein there is provided a different type of push element for moving the cassette inner frame 31 rearwards to facilitate re-insertion of the protective board 19. Each push element of this embodiment comprises a straight lever 33', which is pivotally mounted on a fixed pin 52 attached to the upper end of a plate 51 that is fixedly attached to, and extends upwards from the shaft 32 controlled by the external knob 8. The forward end of each lever 33' is attached to one end of a compression spring 53, whose other end is fixedly attached to a forward wall of the camera main portion 1. Normally, i.e., when the knob 8 is unactuated. the springs 53 hold the levers 33' in horizontal alignment, and, acting through the levers 33' and pins 52, cause the plates 51 to be pivoted forwards to positions in which the rear ends of the levers 33' are out of contact with the cassette 15, as indicated by the dashed line portion of FIG.

18. When it is required to re-insert the board 19, the knob 8 is rotated to bring the plates 51 into a generally vertical alignment, whereby the levers 33', which are still held horizontal by the springs 53, move through the cassette front openings 18 (FIG. 19), and push the top end of the inner frame 31 rearwards. In this embodiment, the board 19 is re-inserted manually, and the extension plate 38 is employed, but it is not necessary to release the knob 8 when the board 19 reaches the levers 33', since the levers 33' are pivotally mounted on the pins 52, and so are simply swung downwards by the board 19, to the alignment indicated by the chain-dot line portion of FIG. 18.

Figures 20, 21, 22:
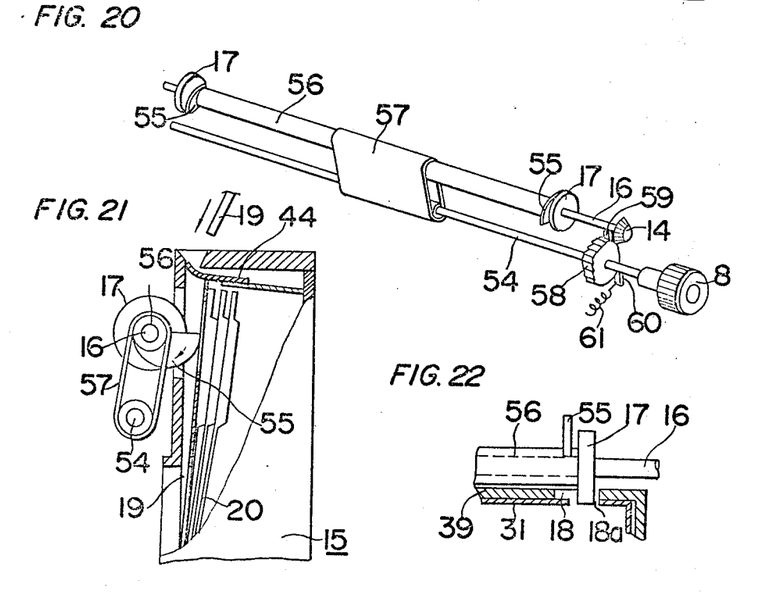
FIG. 20 is a detail view of friction roller and push element means therein of a fifth embodiment of the invention.
FIG. 21 is a cross-sectional view showing friction roller and push element of FIG. 20.
FIG. 22 is a detail view showing the location of the means of FIG. 20 relative to a cassette.

FIGS. 20 through 22 show another alternative embodiment in which the protective board 19 is inserted manually, and employing the extension plate 38, and in which the control knob 8 is rotatable in one direction only.

In FIG. 20, there is provided a rotatory shaft 54, which extends horizontally, below the friction roller shaft 16, and on one end of which is fixedly attached the external control knob 8. Extending between the rollers 17 on the shaft 16 there is provided a sleeve 56, within which the shaft 16 is freely rotatable. At opposite ends of the sleeve 56 there are provided fixedly attached cams 55, each having a lobe. A belt 57 passes around, and is in frictional contact with, the shaft 54 and sleeve 56, whereby, upon rotation of the shaft 54 by the knob 8, the sleeve 56 and cams 55 also are rotated. A ratchet 58 is fixedly mounted on the shaft 54, near the knob 8 end thereof. The ratchet 58 is engaged by a detent 59, which is formed at one end of a small plate 60, whose other end is connected to a spring 61, which exerts a force to maintain the detent 59 in contact with the ratchet 58. The knob 8 and shaft 54 may be turned in one direction (clockwise in the drawing), and is prevented from moving in the opposite direction by engagement of the detent 59 and ratchet 58. The shaft 54 and sleeve 56 are normally rotated to positions in which the cam lobes are out of contact with the cassette 15, as indicated in FIG. 22. When the protective board 19 is to be re-inserted into the cassette 15, the knob 8 is rotated clockwise to turn the cam lobes towards the cassette 15, whereby the inner frame 31 is pushed rearwards, as indicated in FIG. 21. For convenience, the knob 8 and side wall 1c of the camera main portion 1 may be marked to indicate the knob 8 setting at which the cams 55 push the inner frame 31 rearwards. After being turned to this setting, the knob 8 may be released, as it is prevented from moving back by the detent 59. The board 19 may therefore enter the cassette 15 easily, and is not hindered when it reaches the cams 55, which are simply rotated clockwise, away from the inner frame 31, by the board 19 moving downwards into the cassette 15.

Figure 23:
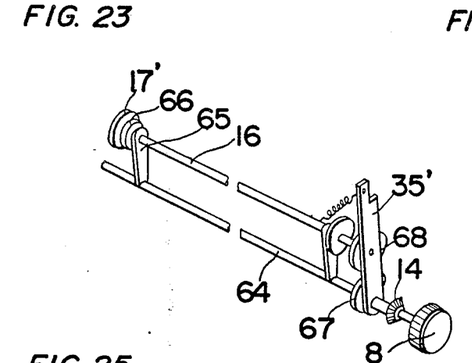
FIG. 23 is a detail view of friction roller and push element means therein of a sixth embodiment of the invention.
Figure 24:
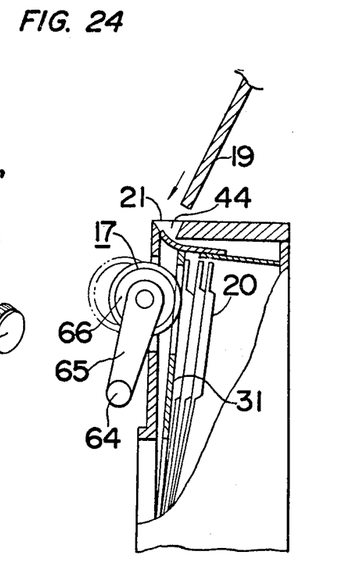
FIG. 24 is a cross-sectional view showing the friction roller and push element of FIG. 23.
Figure 25:
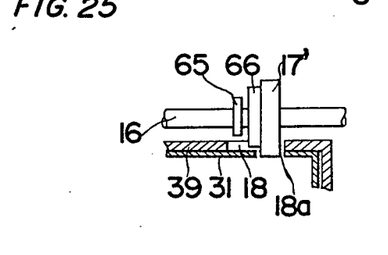
FIG. 25 is a detail view showing location of the means of FIG. 23 relative to a cassette.

Reference is now had to FIGS. 23 through 25, which shows another alternative embodiment of the invention.

In FIG. 23, the knob 8 is fixedly mounted on the end of a rotatable shaft 64, which passes through and is rotatable in the lower portion of a guide plate 35', and to which are fixedly attached two well-spaced, upwardly extending support pieces 65. The friction roller shaft 16 passes through, and is rotatably supported in the upper ends of the support pieces 65. The friction rollers and push elements are constituted by two-step wheels, which are fixedly mounted on the shaft 16, and, as shown most clearly in FIG. 25, each of which comprises a large diameter portion constituting a friction roller 17', and a small diameter portion constituting a push element 66. In FIG. 23, a wheel 68 is fixedly mounted on the shaft 16, near one end thereof, and this end of the shaft 16 is rotatably mounted in an upper portion of the guide plate 35'. The wheel 68 is in frictional contact with, and may be driven by, a wheel 67, which is rotatably mounted on the shaft 64. In this embodiment, the bevel gear 14, to which drive is supplied from the motor 10, via the clutch 11 and bevel gear 13, is rotatably mounted on the shaft 64, and connects to a sleeve, which also is rotatably mounted on the shaft 64, extends rotatably through the lower portion of the guide plate 35', and is fixedly connected to the wheel 67, whereby the friction rollers 17' can be driven by motor 10 drive supplied via the wheels 67, 68. The upper end of the guide plate 35' connects to a spring 36 which normally holds the plate 35' and hence shaft 16 in an alignment in which the rollers 17' pass through the cassette front openings 18, 18a, but the push elements 66 do not contact the cassette 15, as shown in FIG. 25.

Referring to FIG. 24, when the board 19 is to be re-inserted into the cassette 15, the knob 8 is turned clockwise, and, acting through the shaft 64 and support pieces 65, swings the shaft 16 rearwards, together with the rollers 17' and push elements 66, whereby the inner frame 31 is pushed rearwards to allow the board 19 to enter the cassette 15. At the same time, the shaft 16 causes the plate 35' to pivot rearwards, counter to the force of the spring 36. When the board 19 reaches the push elements 66, the knob 8 must be released, at least slightly, to permit the board 19 to move past, complete insertion of the board 19 being effected by means of the extension plate 38. When the knob 8 is released completely, the spring 36 returns the plate 35', and hence shaft 16, push elements 66, and rollers 17', to their original configuration.

Needless to say, in the alternative embodiments described above, there may be provided a switch actuated by turning of the knob 8 and causing the friction rollers 17 to be driven in reverse, and the extension plate 38 may be dispensed with, or there may be provided a switch 46 in the re-insertion passage 23, and associated solenoid and other elements, and re-insertion of the board 19 made automatic. In the latter case, of course, the board 19 would not need to comprise a depression, so as to actuate a two-step switch to move push elements forwards, since the levers 33' or cams 55 are easily moved by the board 19 itself.

Figure 26:
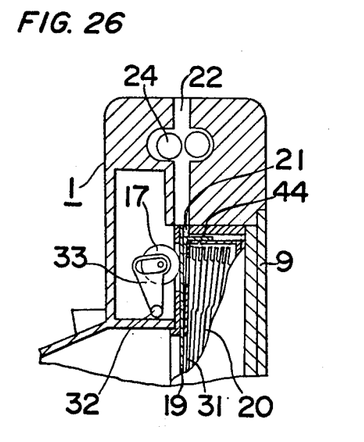
FIG. 26 is a cross-sectional view of a seventh embodiment of the invention
Figure 27:
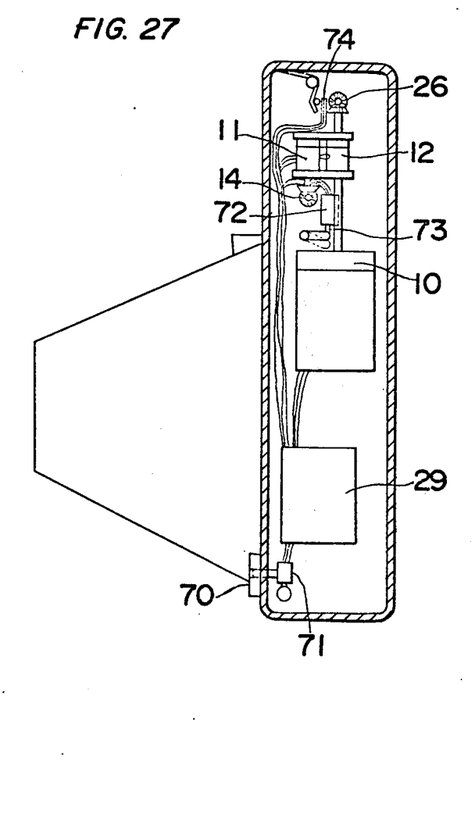
FIG. 27 is a side view taken in section showing the layout of drive means therein.

Elements of all the embodiments described above may be employed in the embodiment of the invention, which is shown in FIGS. 26, 27, and in which the protective board is removed and re-insertion via the extraction passage 22, there being provided no passage 23.

This embodiment comprises an externally located button 70, which is depressed, when it is required to re-insert the board 19, in order to unload the cassette 15. Depression of the button 70 actuates an internally provided switch 71, which, acting through the control box 29, causes both the clutches 11, 12, to be engaged, and the motor 10 to supply reverse drive, whereby the processing rolls 24 and the friction rollers 17 are rotated in reverse. At the same time, actuation of the switch 71 causes a solenoid 72 to be energized, whereupon a plunger 73 associated therewith causes the push element shaft 32 to turn, and the push elements 33 to move towards the cassette 15 and push the cassette inner frame 31 rearwards. The protective board 19 is inserted downwards into the passage 22, as far as the processing rolls 24, by which it is then drawn downwards and directed through the cassette extraction slit 21 into the cassette 15. Passage of the board 19 between the rolls 24 causes the forward roll 24 to be moved forward and close a switch 74. Closure of the switch 74 actuates two delay circuits in the control box 29. One delay circuit de-energizes the solenoid 72 after a delay sufficient for the lower end portion of the board 19 to reach the level of the friction rollers 17, whereby the push elements 33 are pivoted forwards, out of contact with the cassette 15, and the lower end portion of the board 19 is pressed against the rollers 17 by the cassette inner frame 31, which is pushed forwards by the plate spring 40. The other delay circuit causes the clutches 11, 12 to disengage and the motor 10 to stop after a delay sufficient for the board 19 to have been re-inserted completely into the cassette 15.

As is clear from the above description, the present invention provides an auto-process camera which permits monosheet or other film cassettes to be unloaded and re-loaded any number of times, without detriment to monosheets contained therein, and thus presents the advantages of greater freedom and economy in the practice of photography.

It is evident that many modifications to the present invention will be apparent to those skilled in the art. The scope of the invention should therefore be determined from the appended claims.

What is claimed is:
1. In an auto-process camera having a light-proof chamber for retention of a cassette containing a plurality of film monosheets and a light-proof protective board, in a main camera body, said cassette having a front wall formed with an opening through which a foremost monosheet is exposed, the improvements comprising:
   a. a first passage through said main camera body into said chamber for removal of said protective board and film monosheets from said cassette;
   b. a second passage through said main camera body into said chamber for reinsertion of said protective board into said cassette, said first and second passages having a common inner opening to said chamber;
   c. processing rolls disposed in said first passage to effect processing and removal of said monosheets and protective board;
   d. forwarding means in said main camera body adjacent the front wall of said cassette, said means frictionally engaging said foremost monosheet or protective board, said forwarding means being selectably actuable to forward said monosheet or protective board from said cassette to said processing rolls;
   e. pushing means in said main camera body adjacent said forwarding means, said pushing means selectably actuable to move said monosheets in said cassette toward the rear thereof; and
   f. drive means in said main camera body for driving one of said processing rolls, said forwarding means and said pushing means;
whereby, said protective board may be removed from said cassette to permit exposure of said film monosheets and subsequently reinserted into said cassette while said cassette is still in said main camera body.

2. An auto-process camera as claimed in claim 1, wherein switch means are provided in said main camera body adjacent said pushing means, said pushing means closing said switch means at one extremity of its travel to reverse said drive means to effect reverse drive of said forwarding means, whereby a protective board may be drawn into the cassette by said forwarding means.

3. An auto-process camera as claimed in claim 1, wherein there is provided a shaft rotatably supported in said main camera body on which said pushing means are fixedly mounted, a solenoid-actuated plunger means which is operatively connected to said shaft to normally bias said shaft in a position wherein said pushing means are maintained out of contact with said cassette in said camera, and which is actuable to rotate said shaft and bring said pushing means into contact with said cassette, and a switch means located in said second passage, said switch means being closeable by a protective board passing through said second passage, the closing of said switch means causing actuation of said solenoid-actuated plunger means to bring said pushing means into contact with said cassette.

4. An auto-process camera as claimed in claim 1, wherein said forwarding means is fixedly attached to a first shaft rotatively supported in said main camera body and driven by said drive means; and said pushing means are fixedly attached to a second shaft rotatively supported in said main camera body parallel to said first shaft, one end of said second shaft extending through said main camera body and having a knob thereon for manual actuation of said pushing means; spring means attached to said pushing means and said main camera body to normally bias said pushing means away from said cassette.

5. An auto-process camera as claimed in claim 4, wherein said pushing means are constituted by rigid levers.

6. An auto-process camera as claimed in claim 4, wherein said pushing means comprises levers pivotally mounted on support extension fixedly mounted on said second shaft, said spring means engaging said levers to normally bias said levers out of contact with said cassette in said main camera body.

7. An auto-process camera as claimed in claim 1, wherein said forwarding means is fixedly attached to a first shaft rotatively supported in said main camera body and driven by said drive means; and wherein said pushing means comprises:
   a. a second shaft rotatively supported in said main camera body parallel to said first shaft, one end of said second shaft extending through said main camera body;
   b. a knob fixedly attached to said one end of said second shaft for manual actuation of said pushing means;
   c. a sleeve rotatably mounted on said first shaft;
   d. cam means affixed to each end of said sleeve;
   e. ratchet means connected to said second shaft to allow rotation in only one direction;
   f. drive transmission means passing around and in frictional contact with said sleeve and said second shaft;
whereby, rotation of said second shaft causes rotation of said sleeve and said cam means.

8. An auto process camera as claimed in claim 1, wherein; said forwarding means and said pushing means comprise:
   a. a first shaft rotatively supported in said main camera body
   b. a second shaft rotatively supported in said main camera body and having one end extending through said main camera body;
   c. a knob fixedly attached to said one end of said second shaft for manual actuation of said pushing means;
   d. a first pair of roller wheels fixedly attached to said first shaft;
   e. a second pair of roller wheels having a diameter smaller than that of said first pair of roller wheels and fixedly attached to said first shaft adjacent said first pair of roller wheels;
   f. support members fixedly attached to and projecting upwardly from said second shaft, said support member rotatively supporting said first shaft;
   g. guide plate means rotatably supported on said first and second shafts;
   h. a spring engaging said guide plate means to normally bias said guide plate means away from said cassette;
   i. a first drive wheel fixedly mounted on said first shaft; and
   j. a second drive wheel rotatably mounted on said second shaft and frictionally engaging said first drive wheel and driven by said drive means.

9. In an auto-process camera having a light-proof chamber for retention of a cassette containing a plurality of film monosheets and a light-proof protective board, in a main camera body, said cassette having a front wall formed with an opening through which a foremost monosheet is exposed, the improvement comprising:
   a. a passage through said main camera body communicating the exterior of said camera with said chamber;
   b. processing rolls disposed in said passage to effect removal and processing of said protective board and said film monosheets from said camera;
   c. forwarding means in said main camera body adjacent the front wall of said cassette, said means frictionally engaging said foremost monosheet or protective board, said forwarding means being selectably actuable to forward said monosheet or protective board from said cassette to said processing rolls;
   d. pushing means in said main camera body adjacent said forwarding means, said pushing means selectably actuable to move said monosheets in said cassette toward the rear thereof;
   e. reversible drive means in said main camera body for driving one of said processing rolls, said forwarding means and said pushing means;
   f. means to actuate said reversible drive means in either a forward or reverse direction from externally of said camera whereby said protective board may be removed from said cassette to permit exposure of said film monosheets and subsequently reinserted into said cassette while said cassette is still in said main camera body.

* * * * *